United States Patent [19]

Kohno et al.

[11] Patent Number: 5,200,658
[45] Date of Patent: Apr. 6, 1993

[54] ELECTRIC MOTOR WITH THROUGH-BOLT GUIDES FOR MOUNTING

[75] Inventors: Teruhisa Kohno; Seiji Nokubo, both of Hyogo, Japan

[73] Assignee: Sumitomo Electric Industries, Ltd., Osaka, Japan

[21] Appl. No.: 800,166

[22] Filed: Nov. 27, 1991

[30] Foreign Application Priority Data

Nov. 28, 1990 [JP] Japan .................. 2-127123[U]

[51] Int. Cl.⁵ ............................................. H02K 5/00
[52] U.S. Cl. ........................................ 310/89; 310/91; 310/154
[58] Field of Search ............. 29/596; 310/89, 91, 310/154, 156, 239; 411/371, 546, 531

[56] References Cited

U.S. PATENT DOCUMENTS

| | | | |
|---|---|---|---|
| 2,763,800 | 9/1956 | Curley | 310/239 |
| 3,083,310 | 3/1963 | Tweedy et al. | 310/154 |
| 3,258,622 | 6/1966 | Gillespie | 310/154 |
| 3,489,937 | 1/1970 | Maher et al. | 310/154 |
| 4,209,284 | 6/1980 | Lochmann | 310/154 |
| 4,445,060 | 4/1984 | Ruehle et al. | 310/154 |
| 4,546,280 | 10/1985 | Pflüger | 310/239 |
| 4,746,829 | 5/1988 | Strobl | 310/239 |
| 4,897,571 | 1/1990 | Isozumi | 310/239 |
| 5,057,730 | 10/1991 | Yoshida | 310/91 |

FOREIGN PATENT DOCUMENTS

| | | | |
|---|---|---|---|
| 3135217 | 4/1983 | Fed. Rep. of Germany | 310/154 |
| 2149224 | 6/1985 | United Kingdom | 310/91 |

*Primary Examiner*—Steven L. Stephan
*Assistant Examiner*—Matthew Nguyen
*Attorney, Agent, or Firm*—W. G. Fasse

[57] ABSTRACT

An electric motor has guides (8,9,10,11) inside its yoke (1) for guiding the insertion of a through-bolt (7) for mounting the electric motor on a fixed surface, thereby preventing the through-bolt (7) from being attracted by permanent magnets (2) which are provided within the yoke (1). The guides (8,9,10,11) for the through-bolt (7) are formed by protrusions (8) defined in the inner periphery of the yoke (1) for holding the through-bolt (7), or by a sleeve (9,10,11) having a through-hole (9a, 10a, 11a) for receiving the through-bolt (7) passing through an end surface of a cover (6) for the yoke (1) and through a brush holder (5) or through a portion inside the yoke (1).

6 Claims, 5 Drawing Sheets

ELECTRIC MOTOR WITH THROUGH-BOLT GUIDES FOR MOUNTING

FIELD OF THE INVENTION

The present invention relates to an electric motor with through-bolt guides for mounting the motor. More particularly, the invention relates to an improvement in the mounting structure of a compact and strong electric motor which is adapted to drive a brake fluid pressure generating pump for a vehicle or the like.

BACKGROUND INFORMATION

In a fluid pressure brake for a vehicle, an electric motor drives a pump for supplying a brake working fluid under pressure for operating the brakes. Such an electric motor must have strong power, while the same must be reduced in size and simple to assemble.

With reference to FIG. 1, a conventional electric motor is now described which has a thin cylindrical yoke 1 of a magnetic material having a closed end and an open end, and a plurality of permanent magnets 2 which are fixed to the inner peripheral surface of the yoke 1 at regular intervals in the circumferential direction. A rotor 3 is coaxially arranged within the yoke 1, and electromagnets 3a are arranged on the outer periphery of this rotor 3 along its circumference. A brush holder 5 for holding brushes 4, which are in sliding contact with commutators 3b for a rectifying function, is arranged on a side portion of the rotor 3 to cover the open end of the yoke 1. The outer periphery of the brush holder 5 is covered with a cover 6 which serves as an end surface cover for the yoke 1. Through-bolts 7, which are longer than the yoke 1 in the axial direction, are inserted to pass through bolt holes 6a provided in the cover 6 and notches 5a formed in the outer periphery of the brush holder 5. The inserted through-bolts 7 are received in the yoke 1 through clearances between adjacent ones of the permanent magnets 3 and bolt holes (not shown) formed in the closed end of the yoke 1. Thus, threaded portions provided on the forward ends of the through-bolts 7 are fitted with female screws or nuts which are provided on a fixed member (not shown), for fixing the electric motor to a fixed surface.

However, the conventional electric motor has the following problem: In order to drive a pump for a brake working fluid or the like, the electric motor must be reduced in size and increased in power. To this end, diametrical clearances between the permanent magnets 2 and the rotor 3 must be reduced to the minimum, and hence it is difficult to insert the through-bolts 7 through these small clearances. Therefore, the through-bolts 7 must be inserted, between the outer periphery of the rotor 3 and the inner periphery of the yoke 1, in the clearances between adjacent pairs of the permanent magnets 2. However, the through-bolts 7, which are made of magnetic material, are disadvantageously attracted by the permanent magnets 2 when the electric motor is mounted on a fixed surface (not shown) such as a braking system for a wheel or the like. This fact makes it difficult to assemble the known motor.

SUMMARY OF THE INVENTION

In consideration of the aforementioned problem of the prior art, it is an object of the present invention to provide an electric motor, which is easy to assemble so that the through-bolts are not attracted by permanent magnets when the electric motor is mounted on a fixed surface.

In order to attain the aforementioned object, the electric motor according to the present invention comprises a thin cylindrical yoke having a closed end and an open end, and a plurality of permanent magnets which are fixed to the inner periphery of the yoke at regular intervals along the circumference. Inside the permanent magnets, a rotor including armatures and commutators is arranged coaxially with the yoke. The electric motor further comprises brushes for rotating in sliding contact with the commutators, brush holders for holding the brushes in position inside the open end of the yoke, and an end surface cover for closing the open end of the yoke. In such an electric motor, the yoke is mounted on and fixed to a fixed surface by through-bolts which are inserted from the end surface closing member toward the closed end of the yoke in the exterior of the outer periphery of the rotor through a clearance between neighboring permanent magnets. The feature of the present electric motor resides in that through-bolt guide members are provided in a through-bolt receiving position, which is located inside the yoke, for preventing the through-bolt from being attracted by the permanent magnets.

Since such through-bolt guide members are provided in the through-bolt receiving position which is located inside the yoke, the through-bolt is not attracted by the permanent magnets when the electric motor is mounted on a fixed surface. Thus, the through-bolt can be smoothly inserted, whereby assembling the motor is facilitated.

In a preferred embodiment of the present invention, the yoke is formed by an outer yoke serving as a cover for the electric motor and an inner yoke which is provided in the inner periphery of the yoke for enlarging the areas of the magnetic paths, while the through-bolt guide members include protrusions which are defined in the inner yoke.

According to this structure, it is possible to improve the assembling work without increasing the number of components since the through-bolt guide members are not separately provided but are defined as parts of the inner yoke.

In another preferred embodiment of the present invention, the through-bolt guide members include a sleeve having a through-hole for receiving a through-bolt. The sleeve is engaged with a through-bolt receiving hole which is provided in an end surface cover for closing an end of a yoke or brush holder. Such a sleeve can be integrally formed with the end surface cover or the brush holder by integrally molding a plate, for example.

When the through-bolt guide members include a sleeve, the diameter and the length of the sleeve and the distance between the same and the end surface cover are so set that the through-bolt is easily inserted and not attracted by the permanent magnets.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
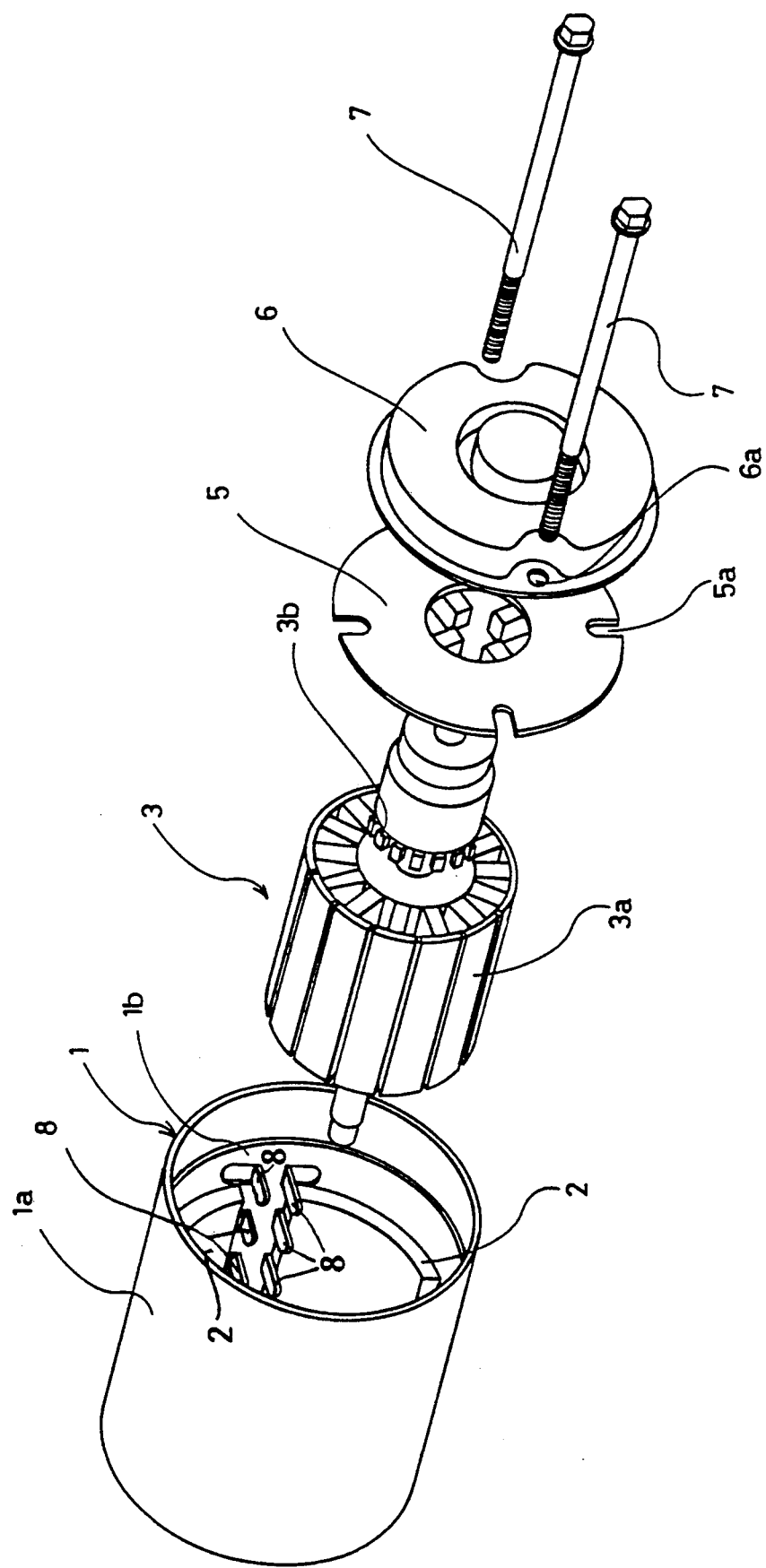
FIG. 2 is an exploded perspective view showing the overall structure of an electric motor according to a first embodiment of the present invention.

FIG. 2 is an exploded perspective view showing an electric motor according to a first embodiment of the present invention. The present electric motor comprises a thin cylindrical yoke 1, which is made of a magnetic material, having a closed end and an open end. A plurality of permanent magnets 2 are fixed to the inner peripheral surface of this yoke 1 substantially at regular intervals with prescribed clearances along the circumferential direction. A rotor 3 is coaxially arranged within the yoke 1, while armatures 3a are provided on the outer periphery of this rotor 3 along its circumferential direction. A brush holder 5 for holding brushes 4, which are in sliding contact with commutators 3b for performing rectification, is arranged on a side portion of the rotor 3 to cover the open end of the yoke 1. The outer side of the brush holder 5 is covered with a cover 6, which serves as an end surface closing member for the yoke 1. Through-bolts 7, which are longer than the yoke 1 in the axial direction, are inserted through bolt holes 6a provided in the cover 6 and notches 5a formed in the outer periphery of the brush holder 5. The through-bolts 7 are received in the yoke 1 through the clearances defined between adjacent ones of the permanent magnets 2 and bolt holes (not shown) provided in the closed end of the yoke 1. Thus, screw portions provided on the forward ends of the through-bolts 7 are fitted with female screws, nuts or the like which are formed in a fixed member (not shown), for fixing the electric motor to the fixed surface.

Figure 1:
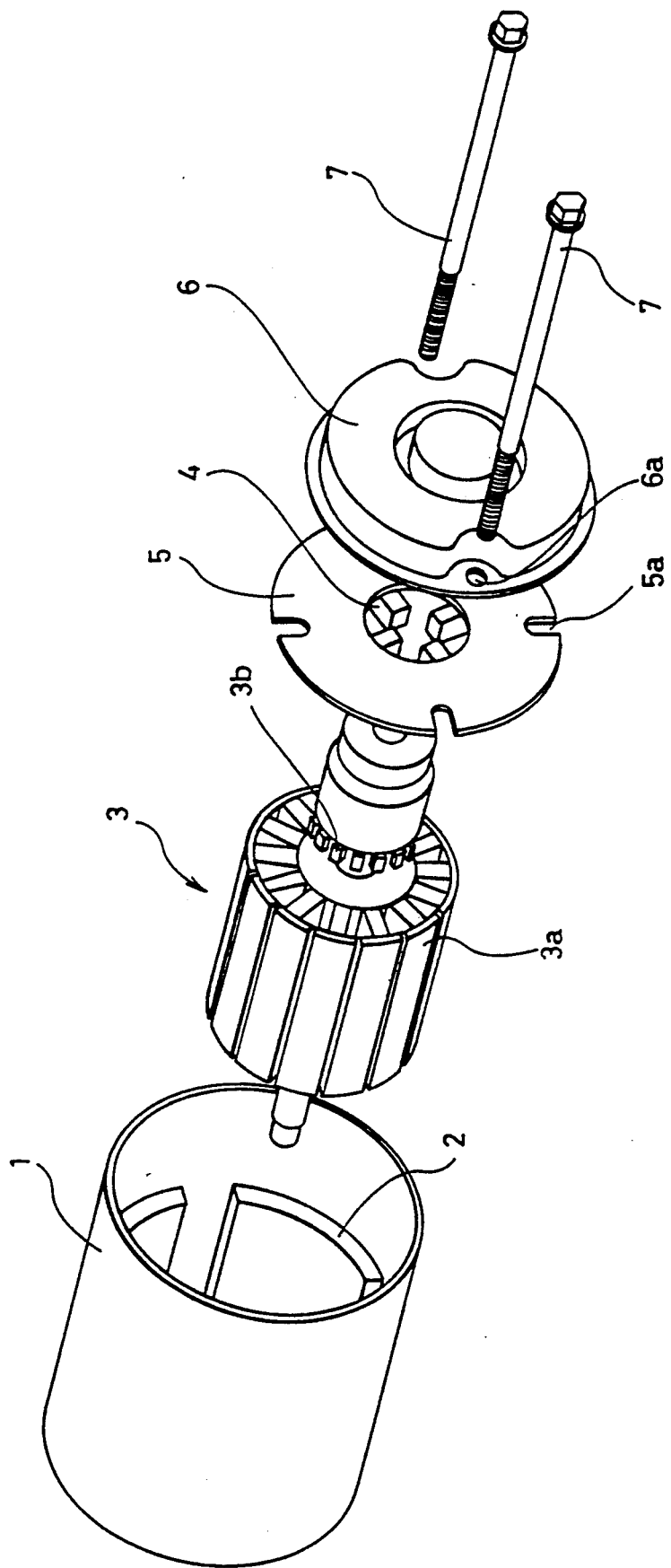
FIG. 1 is an exploded perspective view showing a conventional electric motor.

The aforementioned structure is similar to that of the conventional electric motor shown in FIG. 1. This embodiment, however, is different from the prior art in that the yoke 1 is formed by an outer yoke 1a serving as a cover for the electric motor and an inner yoke 1b which is provided in the inner periphery of the outer yoke 1a for enlarging the areas of magnetic paths, and the inner yoke 1b is provided with guide protrusions 8. The outer and inner yokes 1a and 1b are formed by thin cylindrical plates of magnetic materials. The outer yoke 1a has a closed end and an open end, while both ends of the inner yoke 1b are open. The guide protrusions 8 are formed by inwardly cutting and raising up parts of the inner yoke 1b, for locating the permanent magnets 2 and guiding the through-bolts 7. For this purpose a plurality of these guide protrusions 8 are spaced from each other circumferentially and axially to form a guide channel for the through-bolt 7 through the motor as shown in FIG. 2, while simultaneously locating the permanent magnets in place, also as shown in FIG. 2. The above mentioned cutting and raising up parts of the inner yoke 1b forms the guide protrusions integrally with the inner yoke 1b.

Due to the aforementioned structure, it is possible to define guide means for the through-bolts 7 by parts of the yoke 1, with no necessity for providing a separate member. Consequently, the through-bolts 7 can be inserted for fixing the electric motor to the fixed surface with no attraction by the permanent magnets 2, whereby workability is improved.

Figure 3A:
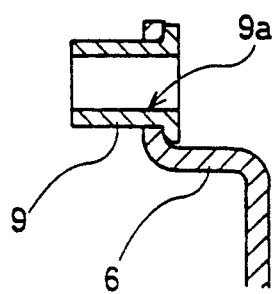
FIG. 3A is a sectional view showing the structure of through-bolt guide members provided in an electric motor according to a second embodiment of the present invention.
Figure 3B:
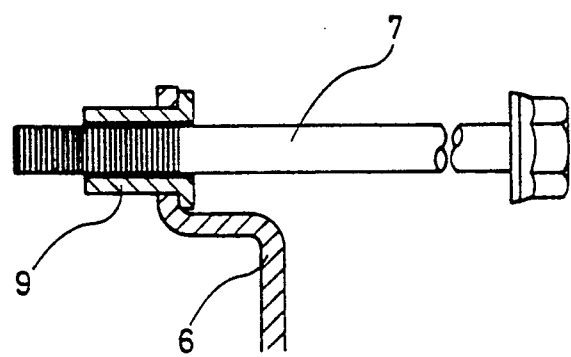
FIG. 3B is a sectional view showing a state of the guide members receiving a through-bolt.

A second embodiment of the present invention is now described with reference to FIGS. 3A to 3D. According to this embodiment, contrary to the first embodiment, guide protrusions 8 of the inner yoke 1b are not provided, but a sleeve 9 passes through a bolt hole 9a, which is provided in a cover 6, for receiving a through-bolt 7 therein, thereby serving as guide member for the through-bolt 7, as shown in FIGS. 3A and 3B. According to this embodiment, it is possible to easily receive the through-bolt 7 and guide the same with no attraction by any permanent magnet, by appropriately setting the length and the inner diameter of the through-hole 9a which is provided in the sleeve 9.

Figure 3C:
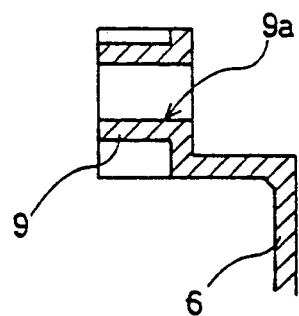
FIGS. 3C and 3D show exemplary covers and sleeves which are integrated with each other.
Figure 3D:
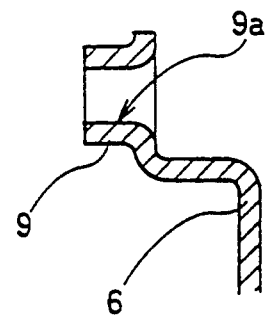

Although the cover 6 and the sleeve 9 are separately provided in FIGS. 3A and 3B, it is also possible to integrally cut a cover 6 and a sleeve 9 from the same material, as shown in FIG. 3C. Alternatively, a cover 6 and a sleeve 9 may be formed by integral molding of a plate, as shown in FIG. 3D.

A third embodiment of the present invention is now described with reference to FIGS. 4A and 4B. According to this third embodiment, a sleeve 10 is engaged with a hole which is provided around the outer periphery of a brush holder 5, for receiving a through-bolt 7 in a through-hole 10a provided therein. According to this embodiment, it is possible to prevent the through-bolt 7 from being attracted by permanent magnets, by appropriately setting the distance between a bolt hole 6a, which is provided in a cover 6, and the sleeve 10, or by the length of the sleeve 10, or by a clearance between the through-hole 10a and the through-bolt 7.

Figure 4A:
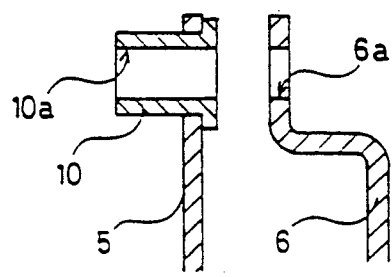
FIG. 4A is a sectional view showing the structure of through-bolt guide members provided in an electric motor according to a third embodiment of the present invention.
Figure 4B:
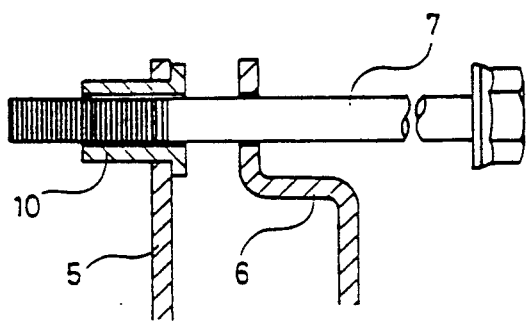
FIG. 4B is a sectional view showing a state of the guide members receiving a through-bolt.
Figure 4C:
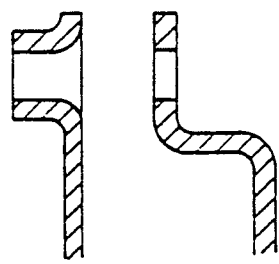
FIG. 4C is a sectional view showing another example of the structure of through-bolt guide members according to the third embodiment.

Although the brush holder 5 and the sleeve 10 are separately provided in FIGS. 4A and 4B, it is also possible to integrally cut a brush holder 5 and a sleeve 10 from the same material as shown in FIG. 4C.

Figure 5A:
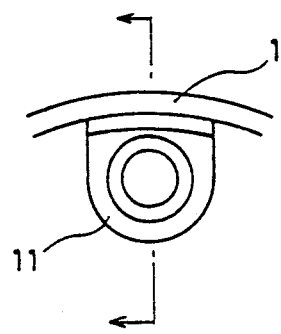
FIG. 5A illustrates the structure of through-bolt guide members provided in an electric motor according to a fourth embodiment of the present invention.
Figure 5B:
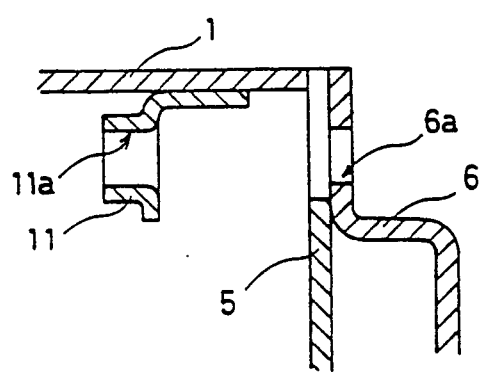
FIG. 5B is a sectional view taken along the line A—A in FIG. 5A.
Figure 5C:
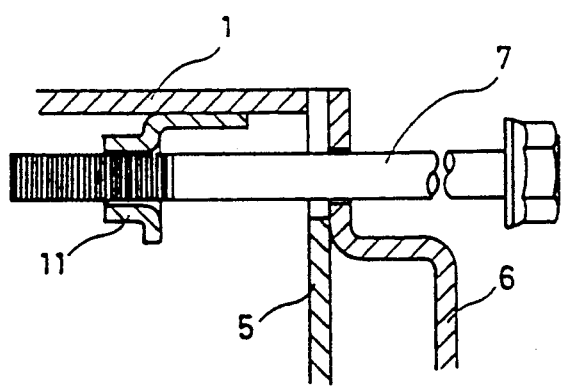
FIG. 5C is a sectional view showing a state of guide members receiving a through-bolt.

A fourth embodiment of the present invention is now described with reference to FIGS. 5A to 5C. According to this embodiment, a sleeve 11 is fixed to the inner periphery of a yoke 1, for receiving a through-bolt 7 in a through-hole 11a provided therein. According to this embodiment, it is possible to sufficiently ensure the distance between a bolt hole 6a, which is provided in a cover 6 for guiding an insertion of the through-bolt 7, and the sleeve 11, for stably guiding the through-bolt 7 so that the same is not attracted by any permanent magnet.

In each of the aforementioned second to fourth embodiments, the diameter and the length of the through-hole 9a, 10a or 11a of the sleeve 9, 10 or 11 and the distance between the sleeve 9, 10, or 11 and the end surface cover 6 are appropriately set so that the through-bolt 7 is easily inserted and not attracted by the permanent magnets 2.

According to each of the embodiments, as hereinabove described, the through-bolt guide members are provided in a position for receiving the through-bolt or bolts, thereby preventing the attraction of the through-bolts by the permanent magnets. Consequently, the through-bolts can be easily inserted for assembling and mounting the motor. The present invention is applied with particular efficiency to an electric motor such as a motor for a pump for pressurizing a brake working fluid for a vehicle. Such motors must be as small as possible yet powerful enough for the intended purpose.

Although the present invention has been described and illustrated in detail, it is clearly understood that the same is by way of illustration and example only and is not to be taken by way of limitation, the spirit of the present invention being limited only by the terms of the appended claims.

What is claimed is:

1. In an electric motor having a hollow cylindrical outer yoke with a closed end and an open end; an inner yoke provided on an inner periphery of said outer yoke for enlarging a magnetic path area; a plurality of permanent magnets fixed to said inner periphery of said inner yoke at regular intervals along a circumference of said inner periphery; a rotor arranged coaxially with said outer yoke, said rotor including armatures and commutators; brushes rotating and sliding with said commutators; an end surface cover for closing said open end of said outer yoke; and at least one through-bolt inserted from said end surface cover toward said closed end of said yoke radially outwardly of an outer periphery of said rotor through a clearance between neighboring permanent magnets; the improvement comprising through-bolt guide means for guiding said at least one through-bolt and for preventing said through-bolt from being attracted by said permanent magnets, said through-bolt guide means including guide protrusions formed integrally with said inner yoke.

2. The electric motor of claim 1, wherein said guide protrusions of said inner yoke for guiding said through-bolt protrude inwardly from said inner yoke.

3. The electric motor of claim 1, wherein said inner yoke includes a magnetic metal plate, and said through-bolt guide protrusions are formed as inwardly bent parts of said metal plate of said inner yoke.

4. The electric motor of claim 1, wherein said through-bolt guide means further includes a sleeve provided in a through-bolt receiving hole of said end surface cover, said sleeve having a through-hole for guiding said through-bolt.

5. The electric motor of claim 1, further comprising brush holding means for holding said brushes between said rotor and said end surface cover, wherein said through-bolt guide means further includes a sleeve provided in a through-bolt receiving hole of said brush holding means and having a guide hole for guiding the through-bolt.

6. The electric motor of claim 1, wherein said guide protrusions formed integrally with said inner yoke are spaced from each other circumferentially and axially for forming a guide channel inside said inner yoke for said through-bolt through said motor and for locating said permanent magnets.

* * * * *